R. G. QUEHL.
GRATE FOR ELEVATOR DUMP PITS.
APPLICATION FILED AUG. 5, 1920.

1,383,151.

Patented June 28, 1921.
2 SHEETS—SHEET 1.

INVENTOR
RICHARD G. QUEHL
By Paul & Paul
HIS ATTORNEYS

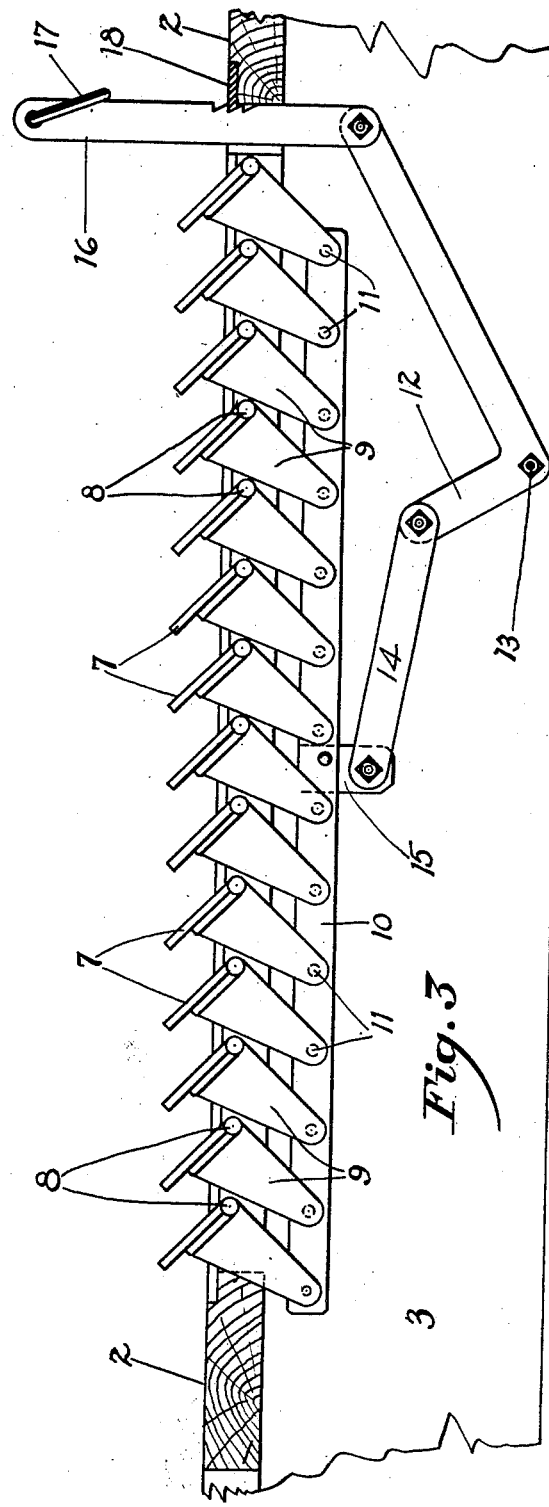
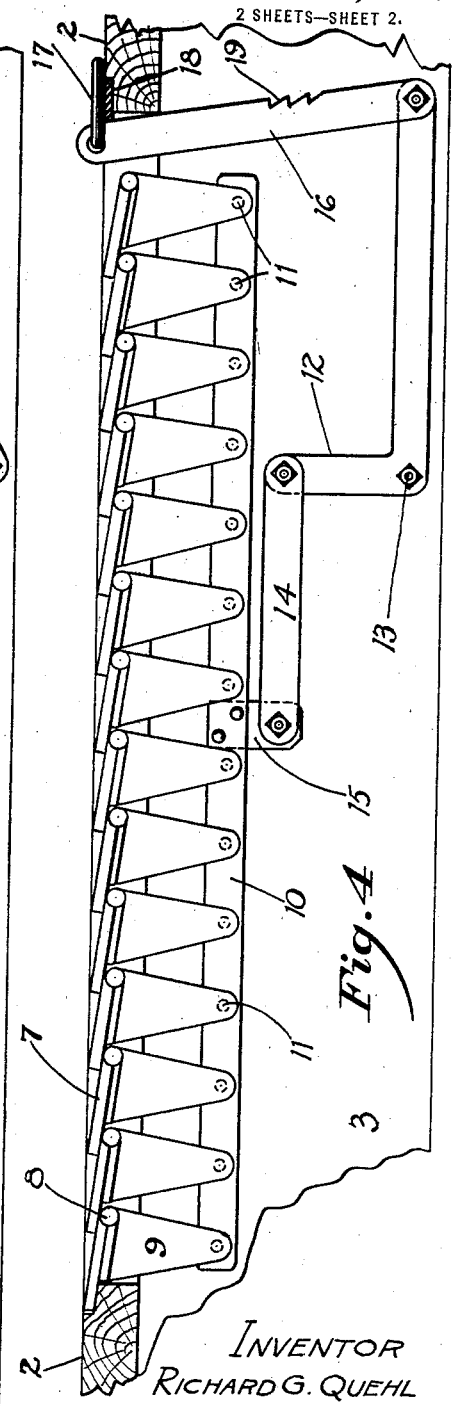

UNITED STATES PATENT OFFICE.

RICHARD G. QUEHL, OF MINNEAPOLIS, MINNESOTA, ASSIGNOR TO THE STRONG-SCOTT MANUFACTURING COMPANY, OF MINNEAPOLIS, MINNESOTA, A CORPORATION OF MINNESOTA.

GRATE FOR ELEVATOR-DUMP PITS.

1,383,151.   Specification of Letters Patent.   Patented June 28, 1921.

Application filed August 5, 1920. Serial No. 401,437.

*To all whom it may concern:*

Be it known that I, RICHARD G. QUEHL, a citizen of the United States, resident of Minneapolis, county of Hennepin, State of Minnesota, have invented certain new and useful Improvements in Grates for Elevator-Dump Pits, of which the following is a specification.

In handling grain in country elevators, a pit is provided into which the grain is dumped from a wagon or truck. Usually trap doors are provided of heavy plank with wood or iron grate bars arranged across the opening leading to the pit. These grate bars have spaces between them and it often happens that mud or other foreign material will fall through the open grate and become mixed with the grain in the pit beneath.

The object of my invention is to provide a dumping grate which, when not in use, can be closed and the entrance of dirt or foreign material into the pit is thereby prevented.

A further object is to provide a grate of compact, strong and durable construction which will support a heavy load and can not easily get out of order.

The invention consists generally in various constructions and combinations, all as hereinafter described and particularly pointed out in the claims.

Figure 1:
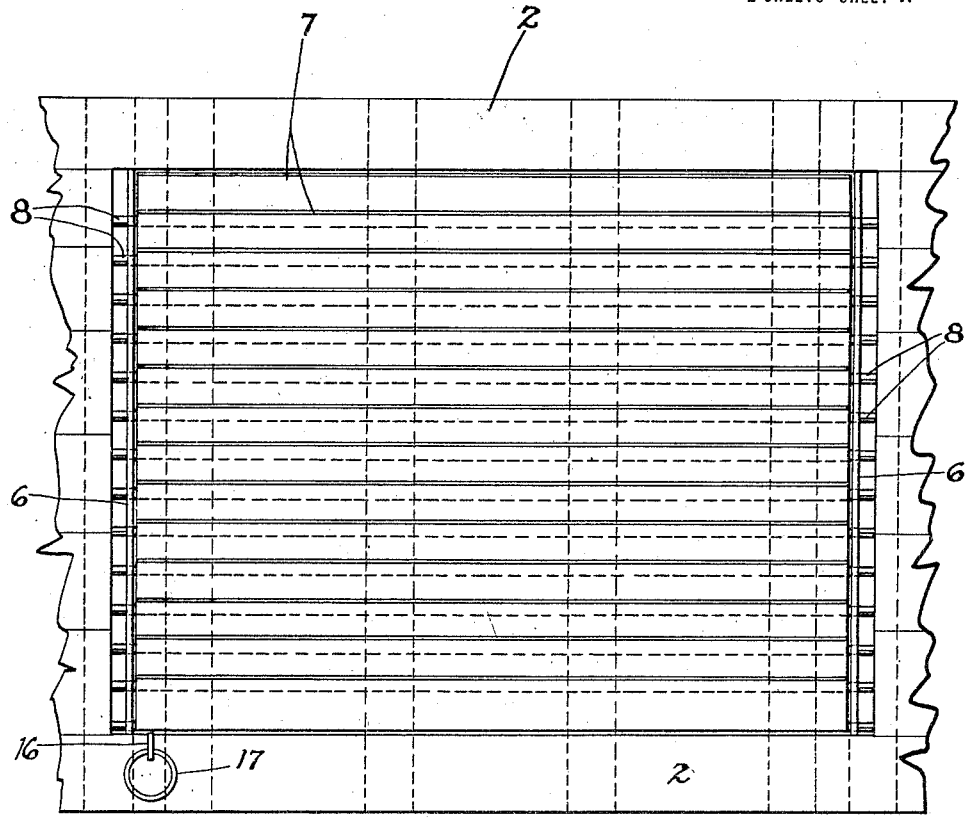
Figure 2:
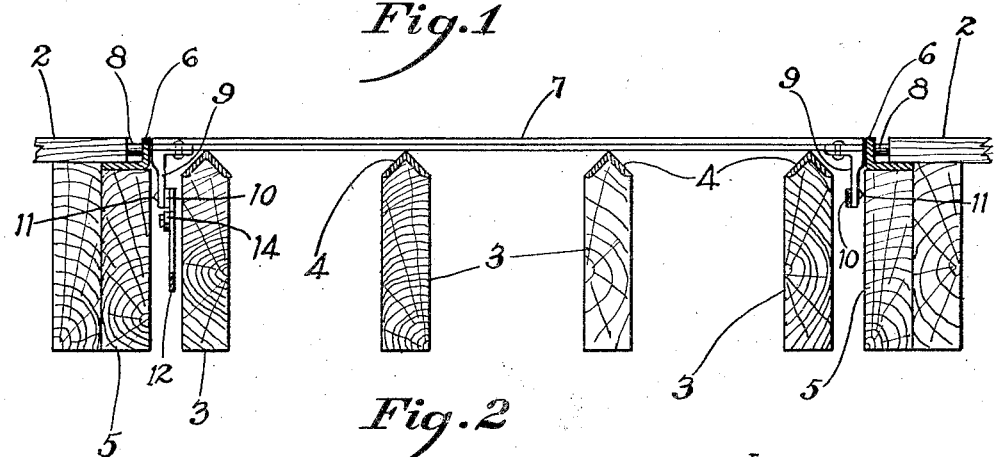

In the accompanying drawings forming part of this specification,

Figure 1 is a plan view of a portion of a dumping platform, showing my grate mounted therein, Fig. 2 is a transverse sectional view of the platform, Fig. 3 is a side elevation, showing the grate bars open, Fig. 4 is a similar view, showing the grate bars closed.

In the drawing, 2 represents the dumping platform and 3 a series of horizontal timbers arranged beneath the platform and extending across the dumping opening in the platform and having beveled upper edges 4 to prevent the grain from collecting or lodging thereon. On each side of the dumping opening I provide timbers 5 having angle bars 6 seated thereon. 7 represents a series of plates having studs 8 at each end mounted in bearings in the vertical flanges of the bars 6. These plates are adapted to swing to an inclined position to provide dumping spaces between them leading to the pit beneath or may be swung down to a substantially horizontal position where they will lap by one another, as shown in Fig. 4, and effectually close the opening leading to the pit. The plates are provided with depending brackets 9 at one end and a bar 10 is pivotally connected at 11 to these brackets. A bell crank 12 is pivoted at 13 beneath the grate and its short arm is connected by a link 14 with a lug 15 that is mounted on the bar 10. The bell crank 12 is adapted to oscillate in a vertical plane and an operating bar 16 is pivotally connected therewith and extends up through the opening in the platform and has a hand grip 17 for operating the bar and bell crank. A plate 18 is mounted in the platform in position to engage teeth 19 in the bar 16 for holding the bar in its raised position, as indicated in Fig. 3.

The plate 18 and teeth 19 act as a ratchet to allow for the adjustment of the plates at different angles. Usually the plates will be adjusted so that the grain can flow between them into the dump at the same angle it is discharged from the wagon or truck. The lapping arrangement of the plates when closed forms a substantial support for the wheels of the wagon or truck which may pass over the grate. The arrangement of the operating lever and bell crank makes it impossible for the bars to open prematurely or accidentally. Normally, they will be locked in their closed position and when open, as shown in Fig. 3, will be held in place by the ratchet device described.

I claim as my invention:

1. The combination, with a dumping platform having a pit opening therein, of a series of plates having bearings at their ends in said platform on each side of said opening and extending across said opening, the edges of said plates being arranged to overlap to close the gap between the plates, and means for tilting said plates on a longitudinal axis to provide spaces between them for the discharge of the grain into the pit beneath.

2. The combination, with a dumping platform having a pit opening therein, of a series of plates mounted to bridge said opening and having bearings at each end near one longitudinal edge, the other longitudinal edge of each plate overlapping the pivoted edge of the adjacent plate, brackets depending from said plates, a bar pivotally connected with said brackets and a mechanism for moving said bar lengthwise to tilt said plates and open or close the gaps between them.

3. The combination, with a dumping platform having a pit opening therein, of a series of plates having bearings at each end in said platform at one side of their longitudinal axis, said plates being arranged to overlap with the longitudinal edge of one plate resting on the adjacent edge of the adjoining plate and means connected with said plates for tilting all of them simultaneously.

4. The combination, with a dumping platform having a pit opening, of a series of plates mounted to tilt in said opening to open or close the passage leading to the pit beneath, a series of depending brackets mounted on said plates, a bar pivotally connected with said brackets, a bell crank, and a link connecting one arm of said crank with said bar, and an operating bar pivotally connected with the other arm of said crank.

In witness whereof I have hereunto set my hand this 2d day of August, 1920.

RICHARD G. QUEHL.